(12) United States Patent
Golden et al.

(10) Patent No.: US 9,857,090 B2
(45) Date of Patent: Jan. 2, 2018

(54) PROGRAMMABLE SMART THERMOSTAT

(71) Applicant: Lennox Industries Inc., Richardson, TX (US)

(72) Inventors: Kyle Golden, Plano, TX (US); Daniel Castillo, Richardson, TX (US); Keith Mowery, Richardson, TX (US); Jayprakash Charavda, Irving, TX (US); Melissa Amoros, Richardson, TX (US); Sunil K. Khiani, Plano, TX (US); Steve Lazar, San Antonio, CT (US)

(73) Assignee: Lennox Industries, Inc., Richardson, TX (US)

( * ) Notice: Subject to any disclaimer, the term of this patent is extended or adjusted under 35 U.S.C. 154(b) by 229 days.

(21) Appl. No.: 14/712,030

(22) Filed: May 14, 2015

(65) Prior Publication Data

US 2016/0209058 A1    Jul. 21, 2016

Related U.S. Application Data

(60) Provisional application No. 62/104,900, filed on Jan. 19, 2015.

(51) Int. Cl.
*G06F 7/00* (2006.01)
*F24F 11/00* (2006.01)
(Continued)

(52) U.S. Cl.
CPC ........ *F24F 11/0034* (2013.01); *F24F 11/006* (2013.01); *F24F 11/0009* (2013.01);
(Continued)

(58) Field of Classification Search
CPC ...... F24F 11/0034; F24F 11/006; F24F 11/02; F24F 11/0086; F24F 11/0009;
(Continued)

(56) References Cited

U.S. PATENT DOCUMENTS 6,385,510 B1    5/2002 Hoog et al.
D473,151 S       4/2003 Shaland et al.
(Continued)

OTHER PUBLICATIONS

U.S. Appl. No. 14/712,019, Golden et al.
(Continued)

*Primary Examiner* — Ziaul Karim
(74) *Attorney, Agent, or Firm* — Winstead PC

(57) ABSTRACT

A home environment system includes a programmable thermostat and at least one server configured to communicate with the programmable thermostat via a wireless network. The at least one server is configured to receive information regarding work performed on at least one component of an HVAC system, generate a first report regarding the work performed, receive information regarding subsequent work performed on the at least one component of the HVAC system, generate a second report regarding the subsequent work performed, and perform a comparison between the first report and the second report. The at least one server is further configured to generate a comparison report that indicates differences between the first report and the second report and forward the generated comparison report to at least one of the programmable thermostat and at least one communication device.

12 Claims, 15 Drawing Sheets

(51) Int. Cl.
*G05B 19/042* (2006.01)
*G06Q 10/00* (2012.01)
*H04L 12/28* (2006.01)
*H04L 29/08* (2006.01)
*F24F 11/02* (2006.01)

(52) U.S. Cl.
CPC .......... *F24F 11/0086* (2013.01); *F24F 11/02* (2013.01); *G05B 19/042* (2013.01); *G05B 19/0426* (2013.01); *G06Q 10/20* (2013.01); *H04L 12/2809* (2013.01); *H04L 67/12* (2013.01); *F24F 2011/0058* (2013.01); *F24F 2011/0091* (2013.01); *G05B 2219/25168* (2013.01); *G05B 2219/2614* (2013.01)

(58) Field of Classification Search
CPC ......... F24F 2011/0091; G05B 19/0426; G05B 19/042; G05B 2219/2614; G05B 2219/25168; H04L 12/2809; H04L 67/12; G06Q 10/20
USPC .......................................... 700/228, 275–296
See application file for complete search history.

(56) References Cited

U.S. PATENT DOCUMENTS

| | | | |
|---|---|---|---|
| D591,305 S | 4/2009 | Shimoda | |
| 8,195,313 B1 | 6/2012 | Fadell et al. | |
| 8,365,074 B1 | 1/2013 | Wagner et al. | |
| D676,060 S | 2/2013 | Frost et al. | |
| D676,457 S | 2/2013 | Frost et al. | |
| D682,850 S | 5/2013 | Del Pasqua | |
| D687,845 S | 8/2013 | Lee | |
| D690,322 S | 9/2013 | Matas et al. | |
| 8,620,841 B1 | 12/2013 | Filson et al. | |
| D697,076 S | 1/2014 | Oda et al. | |
| D701,515 S | 3/2014 | Matas et al. | |
| D701,869 S | 4/2014 | Matas et al. | |
| D709,913 S | 7/2014 | Hurd | |
| D722,606 S | 2/2015 | Stroupe et al. | |
| D733,591 S | 7/2015 | Golden et al. | |
| D734,179 S | 7/2015 | Golden et al. | |
| D736,827 S | 8/2015 | Omiya | |
| 9,167,368 B2 | 10/2015 | De Jong et al. | |
| D742,898 S | 11/2015 | Matas et al. | |
| D748,126 S | 1/2016 | Sarukkai et al. | |
| D749,092 S | 2/2016 | Lee et al. | |
| D755,201 S | 5/2016 | Kim | |
| D758,422 S | 6/2016 | Zhao | |
| D759,077 S | 6/2016 | Bergmann et al. | |
| D759,079 S | 6/2016 | Carlton et al. | |
| D760,246 S | 6/2016 | Birks et al. | |
| D761,297 S | 7/2016 | Eder | |
| D763,868 S | 8/2016 | Lee et al. | |
| D767,586 S | 9/2016 | Kwon et al. | |
| D775,658 S | 1/2017 | Luo et al. | |
| D777,744 S | 1/2017 | Wang et al. | |
| D781,327 S | 3/2017 | Conze et al. | |
| D783,046 S | 4/2017 | Dzjind et al. | |
| D783,672 S | 4/2017 | Rajasankar et al. | |
| D785,017 S | 4/2017 | Wang et al. | |
| D786,269 S | 5/2017 | Lin et al. | |
| D786,278 S | 5/2017 | Motamedi | |
| D787,551 S | 5/2017 | Oh et al. | |
| 2003/0070437 A1 | 4/2003 | Hafner et al. | |
| 2007/0136679 A1 | 6/2007 | Yang | |
| 2007/0241203 A1 | 10/2007 | Wagner et al. | |
| 2009/0079765 A1 | 3/2009 | Hoover | |
| 2010/0070085 A1 | 3/2010 | Harrod et al. | |
| 2010/0070089 A1 | 3/2010 | Harrod et al. | |
| 2011/0015802 A1* | 1/2011 | Imes ................. | G05D 23/1923 700/300 |
| 2011/0046792 A1* | 2/2011 | Imes ................. | H04L 67/42 700/278 |
| 2011/0157046 A1 | 6/2011 | Lee et al. | |
| 2011/0202185 A1* | 8/2011 | Imes ................. | H04L 43/08 700/277 |
| 2012/0064923 A1* | 3/2012 | Imes ................. | F24F 11/0012 455/457 |
| 2012/0124520 A1 | 5/2012 | Samp et al. | |
| 2012/0130547 A1 | 5/2012 | Fadell et al. | |
| 2012/0131504 A1 | 5/2012 | Fadell et al. | |
| 2012/0179300 A1 | 7/2012 | Warren et al. | |
| 2012/0259470 A1 | 10/2012 | Nijhawan et al. | |
| 2012/0274662 A1 | 11/2012 | Kim et al. | |
| 2013/0151016 A1 | 6/2013 | Bias et al. | |
| 2013/0173064 A1 | 7/2013 | Fadell et al. | |
| 2013/0245837 A1 | 9/2013 | Grohman | |
| 2014/0126425 A1* | 5/2014 | Burd ................. | H04L 12/4633 370/255 |
| 2014/0211985 A1 | 7/2014 | Polese et al. | |
| 2014/0319232 A1 | 10/2014 | Gourlay et al. | |
| 2014/0359453 A1 | 12/2014 | Palfreeman | |
| 2014/0365019 A1 | 12/2014 | Gourlay et al. | |
| 2015/0051741 A1* | 2/2015 | Bruck ................. | G05D 23/1902 700/276 |
| 2015/0100508 A1* | 4/2015 | Binion ................. | G06Q 10/06 705/313 |
| 2015/0127174 A1* | 5/2015 | Quam ................. | F24F 11/0086 700/276 |
| 2015/0167995 A1 | 6/2015 | Fadell et al. | |
| 2015/0308705 A1 | 10/2015 | Sloo et al. | |
| 2016/0189491 A1 | 6/2016 | Sloo et al. | |

OTHER PUBLICATIONS

U.S. Appl. No. 14/711,938, Golden et al.
U.S. Appl. No. 29/535,235, Golden et al.
U.S. Appl. No. 29/535,236, Golden et al.
Energy Efficient Smart Thermostat: Nest, designboom.com [online], published Oct. 26, 2011, [retrieved May 24, 2016], retrieved from the Internet <URL:http://www.designboom.com/technology/energyefficientsmartthermostatnest/>.
Lennox iComfort S30, contractingbusiness.com [online], published Mar. 13, 2015, [retrieved May 24, 2016], retrieved from the Internet <URL:http://contractingbusiness.com/residential-hvac/tech-up-date-march-2015-hydronics-home-automation#slide-0-field_images-32371>.
Nest Smart Thermostat, design-milk.com [online], published Oct. 25, 2011, [retrieved May 24, 2016], retrieved from the Internet <URL:http://design-milk.com/nest-smart-thermostat/>.
Innovative Retail Technologies; "Venstar ColorTouch Thermostats Now Feature Real-Time Weather, Remote Firmware Upgrades and Humidity Support"; https://www.innovativeretailtechnologies.com/doc/venstar-colortouch-feature-real-time-weather-remote-firm-ware-support-0001; Jun. 13, 2013; 4 pages.
National Oceanic and Atmospheric Administration (NOAA); "National Digital Forecast Database (NDFD)"; https://www.ncdc.noaa.gov/data-access/model-data/model-datasets/national-digital-forecast-database-ndfd; Nov. 2015; 3 pages.
U.S. Appl. No. 15/634,260, Khiani, et al.

* cited by examiner

PROGRAMMABLE SMART THERMOSTAT

CROSS-REFERENCE TO RELATED APPLICATIONS

This Application claims the benefit of U.S. Provisional Application 62/104,900 filed on Jan. 19, 2015. U.S. Provisional Application 62/104,900 is incorporated herein by reference.

BACKGROUND

Technical Field

The present invention relates generally to devices configured to regulate operation of one or more of mechanical, electrical, and electronic systems in relation to temperature and, more particularly, but not by way of limitation, to programmable intelligent thermostats having an easy-to-use intuitive user interface for controlling operation of heating, ventilation, and air conditioning (HVAC) systems.

History of Related Art

A thermostat is generally considered to be a device that regulates operation of mechanical, electrical, or electronic systems in relation to temperature. Thermostats are particularly prevalent in heating/cooling systems to deliver a set temperature result. A traditional thermostat display typically demonstrates current temperature settings, desired temperature settings, current time, and the like. However, traditional thermostats do not demonstrate additional information that users may be interested in. For example, users may have to look or step outside to get an indication of outside weather conditions. In addition, traditional thermostats lack an easy-to-use and intuitive user interface.

BRIEF SUMMARY OF THE INVENTION

A home environment system includes a programmable thermostat and at least one server configured to communicate with the programmable thermostat via a wireless network. The at least one server is configured to receive information regarding work performed on at least one component of an HVAC system, generate a first report regarding the work performed, receive information regarding subsequent work performed on the at least one component of the HVAC system, generate a second report regarding the subsequent work performed, and perform a comparison between the first report and the second report. The at least one server is further configured to generate a comparison report that indicates differences between the first report and the second report and forward the generated comparison report to at least one of the programmable thermostat and at least one communication device.

A method includes, by a home environment system, receiving information regarding work performed on at least one component of an HVAC system, generating a first report regarding the work performed, receiving information regarding subsequent work performed on the at least one component of the HVAC system, and generating a second report regarding the subsequent work performed. The method further includes performing a comparison between the first report and the second report, generating a comparison report that indicates differences between the first report and the second report, and forwarding the generated comparison report to at least one of a programmable thermostat and at least one communication device.

A home environment system includes at least one server, wherein the at least one server is configured to implement a method. The method includes receiving information regarding work performed on at least one component of an HVAC system, generating a first report of the work performed, receiving information regarding subsequent work performed on the at least one component of the HVAC system, and generating a second report of the subsequent work performed. The method further includes performing a comparison between the first report and the second report, generating a comparison report that indicates differences between the first report and the second report, and forwarding the generated comparison report to at least one of a programmable thermostat and at least one communication device.

DETAILED DESCRIPTION OF THE INVENTION

Embodiment(s) of the invention will now be described more fully with reference to the accompanying Drawings. The invention may, however, be embodied in many different forms and should not be construed as limited to the embodiment(s) set forth herein. The invention should only be considered limited by the claims as they now exist and the equivalents thereof.

Figure 1:
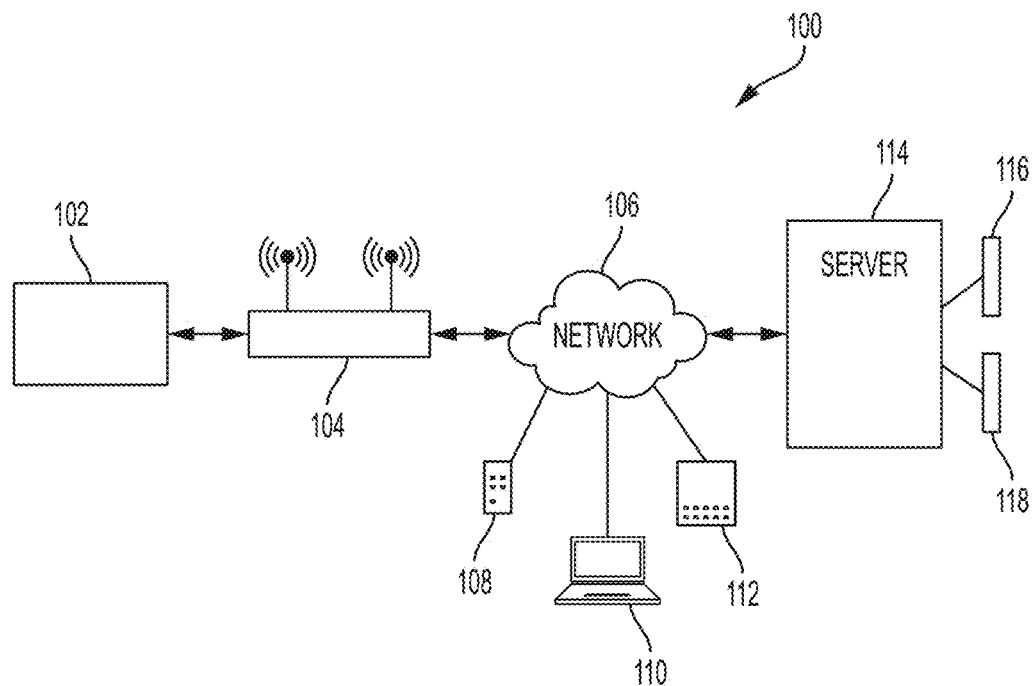
FIG. 1 is a schematic view illustrating a smart home environment system.

FIG. 1 is a schematic view illustrating a smart home environment system 100. The smart home environment system 100 includes a programmable intelligent thermostat 102, a networking device 104, a plurality of communication devices 108, 110, 112, and at least one server or cloud-computing system 114. The networking device 104, the plurality of communication devices 108, 110, 112, and the at least one server or cloud-computing system 114 are each communicably coupled to a network 106. The network 106 can include any number of wired and/or wireless communications networks such as, for example, public or private intranets, a wide area network (e.g., the Internet), cellular networks, satellite communication, and the like.

In a typical embodiment, the networking device 104 serves as networking equipment that, for example, routes/forwards traffic between two or more networks or sub-networks and/or provides access to a network. For example, the networking device 104 allows the programmable intelligent thermostat 102 to communicate with the at least one server or cloud-computing system 114 via the network 106. In a typical embodiment, the networking device 104 can include, for example, routers, switches, bridges, hubs, wireless access points, gateways, a combination of same, and/or the like. In a typical embodiment, the networking device 104 is further configured to communicate with home communication equipment such as, for example, home routers, wireless hubs, access points, and the like. In a typical embodiment, the at least one server or cloud-computing system 114 may be associated with a manufacturer, a support entity, a service provider, and the like. The at least one server or cloud-computing system 114 is configured to communicate with other entities such as, for example, maintenance contractors 116, weather forecasting agencies 118, and the like.

The smart home environment system 100 allows users to contact customer support using, for example, the programmable intelligent thermostat 102. Additionally, the smart home environment system 100 allows software updates to be routinely sent from the at least one server or cloud-computing system 114 to at least one of the programmable intelligent thermostat 102 and other HVAC system components such as, for example, outdoor-unit control board, furnace control board, and the like. Furthermore, the smart home environment system 100 allows maintenance reminders and notifications to be routinely sent from the at least one server or cloud-computing system 114 to the programmable intelligent thermostat 102. In addition, via the smart home environment system 100, the at least one server or cloud-computing system 114 forwards current and predicted weather information to the programmable intelligent thermostat 102.

In a typical embodiment, the plurality of communication devices 108, 110, 112 operated by users are configured to control the programmable intelligent thermostat 102 remotely. A webpage or application may be configured to receive information from the user operated plurality of communication devices 108, 110, 112 and control settings of, for example, the programmable intelligent thermostat 102. For example, the user can view temperature settings of the programmable intelligent thermostat 102 and modify the settings using the plurality of communication devices 108, 110, 112. In a typical embodiment, the plurality of communication devices 108, 110, 112 may be, for example, a personal computer (e.g., desktop or laptop), tablet computer, mobile device (e.g., personal digital assistant (PDA) or smart phone), and the like.

Figure 2A:
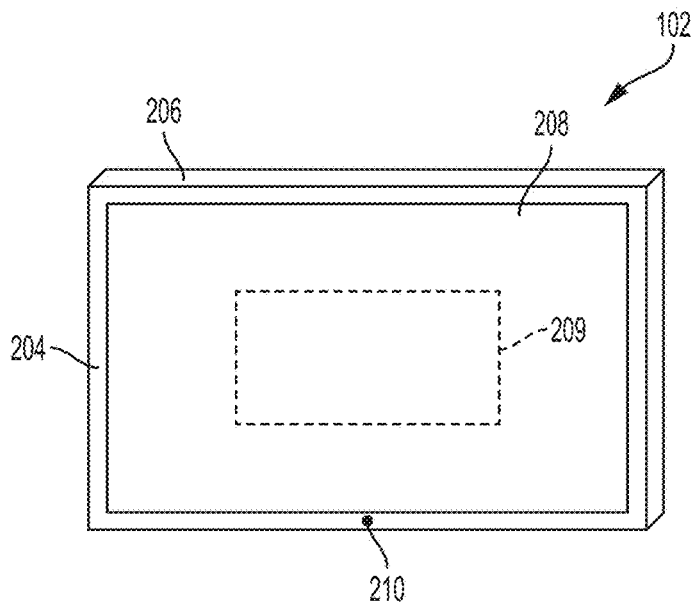
FIG. 2A illustrates an exemplary programmable intelligent thermostat.

FIG. 2A illustrates an exemplary programmable intelligent thermostat 102. The programmable intelligent thermostat 102 includes a front housing 204 and a rear housing 206. The rear housing 206 is removably attached to a wall via fasteners (not illustrated), such as, for example, screws, nuts, snaps, pins, and the like. The front housing 204 includes a display 208, processing circuitry 209, and at least one sensor 210 embedded therein. In a typical embodiment, the at least one sensor 210 may be, for example, a sensor that is configured to detect presence of nearby objects. In one embodiment, a proximity sensor is incorporated in the programmable intelligent thermostat 102 to detect whether the home is occupied. In another embodiment, a light sensor is incorporated in the programmable intelligent thermostat 102 to detect room lighting. In yet another embodiment, a singular sensor such as, for example, a video camera is incorporated in the programmable intelligent thermostat 102 to perform operations such as, for example, room lighting determination, distance determination, facial detection, voice recognition, occupancy detection, and the like.

In a typical embodiment, the display 208 may be any type of visual input/output configured to display one or more characters and/or receive input corresponding to one or more characters. In addition, the display 208 may be configured to display, for example, diagrams, pictures, words, characters, animations, and the like. The display 208 may further be configured to receive input corresponding to one or more diagrams, pictures, words, characters, and the like. In some embodiments, the display 208 may be, for example, a customizable color touch-screen display and may be configured to display respective representations of the keyboard (e.g., a virtual keyboard). In some embodiments, the display 208 may function as, for example, a user interface for receiving user inputs. For exemplary illustration, the programmable intelligent thermostat 102 as illustrated in FIG. 2A is rectangular in shape; however, in other embodiments, the programmable intelligent thermostat 102 may be of various shapes and sizes as needed.

Figure 2B:
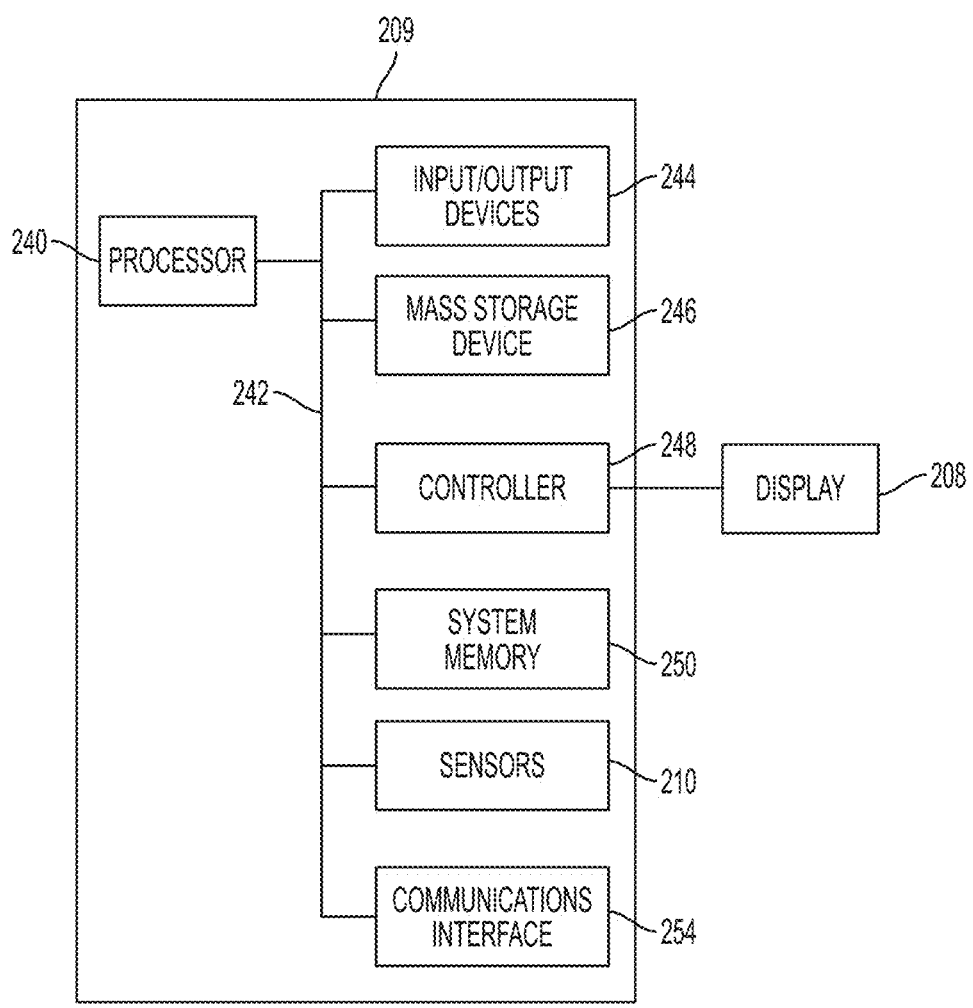
FIG. 2B is a schematic view illustrating processing circuitry of the programmable intelligent thermostat.

FIG. 2B is a schematic view illustrating processing circuitry 209. For illustrative purposes, the processing circuitry 209 will be described relative to FIGS. 1-2A. The processing circuitry 209 includes a processor 240 connected to a bus 242. The bus 242 serves as a connection channel between the processor 240 and various components of the programmable intelligent thermostat 102. The bus 242 may include any combination of hardware, software embedded in a computer readable medium, and/or encoded logic incorporated in hardware or otherwise stored (e.g., firmware) to couple components of the processing circuitry 209 to each other. As an example and not by way of limitation, the bus 242 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCI-X) bus, a serial advanced technology attachment (SATA) bus, a Video Electronics Standards Association local (VLB) bus, or any other suitable bus or a combination of two or more of these. The bus 242 may include any number, type, and/or configuration of buses 242, where appropriate. In particular embodiments, one or more buses 242 (which may each include an address bus and a data bus) may couple the processor 240 to other components of the processing circuitry 209.

User input/output devices 244 are coupled to the processor 240. Examples of input/output devices 244 may include, for example, touchscreens, pointing trackballs, trackpads, and a variety of other input/output devices. Programs and data are stored on a mass storage device 246 coupled to the processor 240.

As an example and not by way of limitation, the mass storage device 246 may include a hard disk drive (HDD), a floppy disk drive, flash memory, an optical disc, a magneto-optical disc, magnetic tape, or a Universal Serial Bus (USB) drive or a combination of two or more of these. The mass storage device 246 may include removable or non-removable (or fixed) media, where appropriate. The mass storage device 246 may be internal or external to the programmable intelligent thermostat 102, where appropriate. In particular embodiments, the mass storage device 246 may be non-volatile, solid-state memory. In particular embodiments, the mass storage device 246 may include read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. The mass storage device 246 may take any suitable physical form and may comprise any suitable number or type of storage. The mass storage device 246 may include one or more storage control units facilitating communication between the processor 240 and the mass storage device 246, where appropriate.

The display 208 is coupled to the processor 240 by a controller 248. A system memory 250 is coupled to the processor 240 to provide the processor 240 with fast storage to facilitate execution by the processor 240. The system memory 250 may be any form of volatile or non-volatile memory including, without limitation, magnetic media, optical media, random access memory (RAM), read-only memory (ROM), flash memory, removable media, or any other suitable local or remote memory component or components. In particular embodiments, the system memory 250 may include random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM, or any other suitable type of RAM or memory. The system memory 250 may store any suitable data or information, including software embedded in a computer readable medium, and/or encoded logic incorporated in hardware or otherwise stored (e.g., firmware). In particular embodiments, the system memory 250 may include main memory for storing instructions for the processor 240 to execute or data for the processor 240 to operate on.

The at least one sensor 210 is coupled to the processor 240 and provides information to the processor 240. The information may include data relative to, for example, occupancy detection, temperature measurements, light measurements, proximity detection, and the like. The processing circuitry 209 also includes a communications interface 254. In a typical embodiment, the communications interface 254 may include hardware, encoded software, or both providing one or more interfaces for communication (such as, for example, packet-based communication) among any networks, any network devices, and/or any other computer systems. As an example and not by way of limitation, the communications interface 254 may include a network-interface controller (NIC) or network adapter for communicating with an Ethernet or other wire-based network and/or a wireless NIC (WNIC) or wireless adapter for communicating with a wireless network.

Depending on the embodiment, the communications interface 254 may be any type of interface suitable for any type of network for which the programmable intelligent thermostat 102 is used. As an example and not by way of limitation, the programmable intelligent thermostat 102 can include (or communicate with) an ad-hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, the programmable intelligent thermostat 102 can include (or communicate with) a wireless PAN (WPAN) (such as, for example, a BLUETOOTH WPAN), a WI-FI network, a WI-MAX network, an LTE network, an LTE-A network, a cellular telephone network (such as, for example, a Global System for Mobile Communications (GSM) network), or any other suitable wireless network or a combination of two or more of these. By way of further example, the communications interface 254 can utilize communication via various other types of wireless communication such as infrared (IR) communication, radio frequency (RF) communication, communication via direct electrical connections, etc. In general, the processing circuitry 209 may include any suitable communications interface 254 for any one or more of these networks, where appropriate.

In a typical embodiment, the processor 240 may be a microprocessor, controller, or any other suitable computing device, resource, or combination of hardware, software and/or encoded logic operable to execute, either alone or in conjunction with other components, (e.g., the system memory 250). Such functionality may include providing various features discussed herein. In particular embodiments, the processor 240 may include hardware for executing instructions. As an example and not by way of limitation, to execute instructions, the processor 240 may retrieve (or fetch) instructions from an internal register, an internal cache, the system memory 250, or the mass storage device 246; decode and execute them; and then write one or more results to an internal register, an internal cache, the system memory 250, or the mass storage device 246.

Figure 3A:
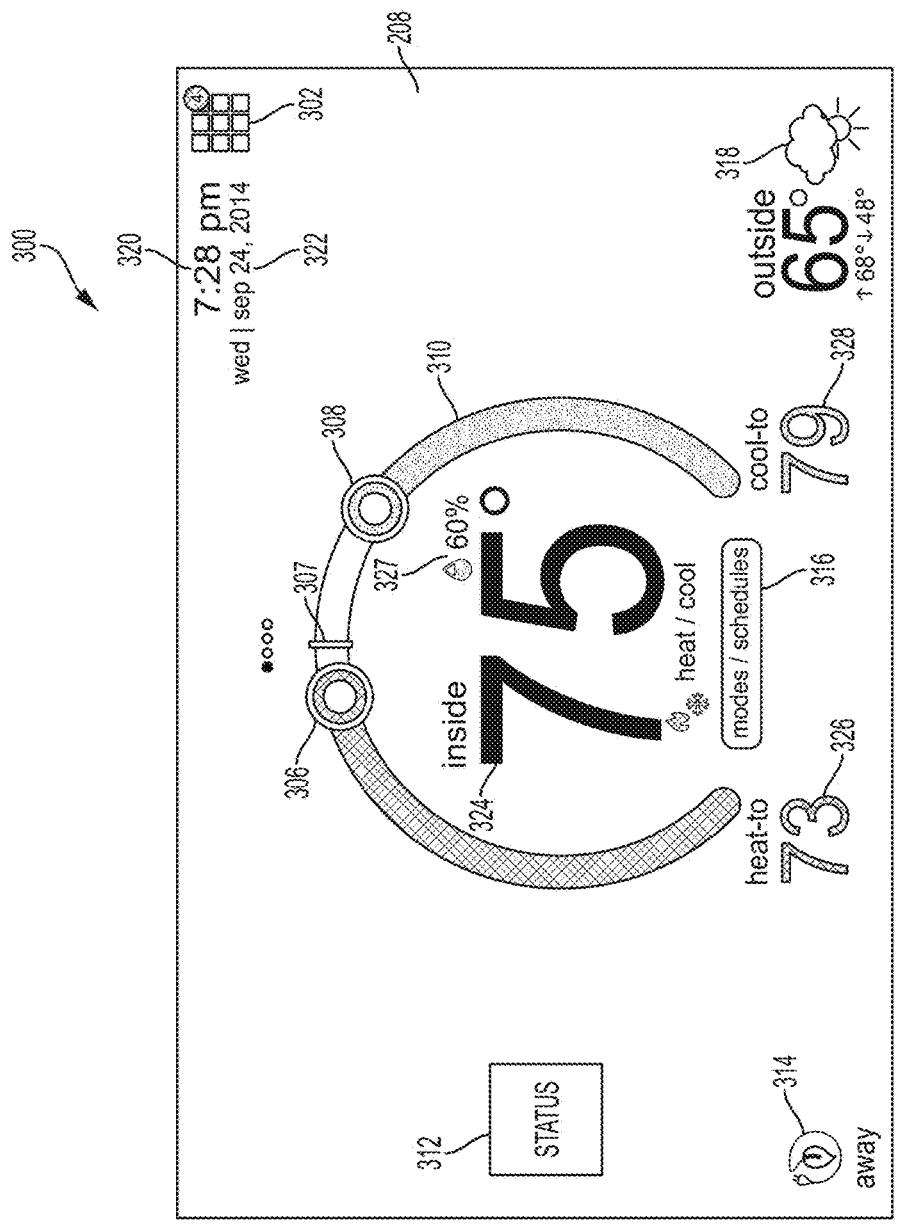
FIG. 3A illustrates an exemplary user interface screen to manage temperature settings of the programmable intelligent thermostat.

FIG. 3A illustrates an exemplary user-interface screen 300 to manage temperature settings of the programmable intelligent thermostat 102. In a typical embodiment, the user-interface screen 300 is presented on the display 208 and may be accessible to a user by tapping on the display 208. The user-interface screen 300 includes a menu tab 302, a heat set-point control 306, a cool set-point control 308, an indoor temperature bar 307, and a temperature scale 310. In a typical embodiment, the temperature scale 310 is substantially horseshoe-shaped and is positioned towards a central region of the user-interface screen 300. In other embodiments, the substantially horseshoe-shaped temperature scale 310 can be positioned at any location on the user-interface screen 300. The heat set-point control 306, the cool set-point control 308, and the indoor temperature bar 307 are positioned on the temperature scale 310.

The user-interface screen 300 further includes a status tab 312, an away tab 314, and a mode/schedule-selection tab 316. The user-interface screen 300 is configured to display present-day information such as, for example, outside temperature 318, current time 320, day/date/year 322, and the like. For exemplary illustration, location of the present-day information such as, for example, outside temperature 318, current time 320, day/date/year 322 as demonstrated in FIG. 3A is exemplary; however, in other embodiments, the present-day information such as, for example, outside temperature 318, current time 320, day/date/year 322 may be at any location on the user-interface screen 300.

Figure 3B:
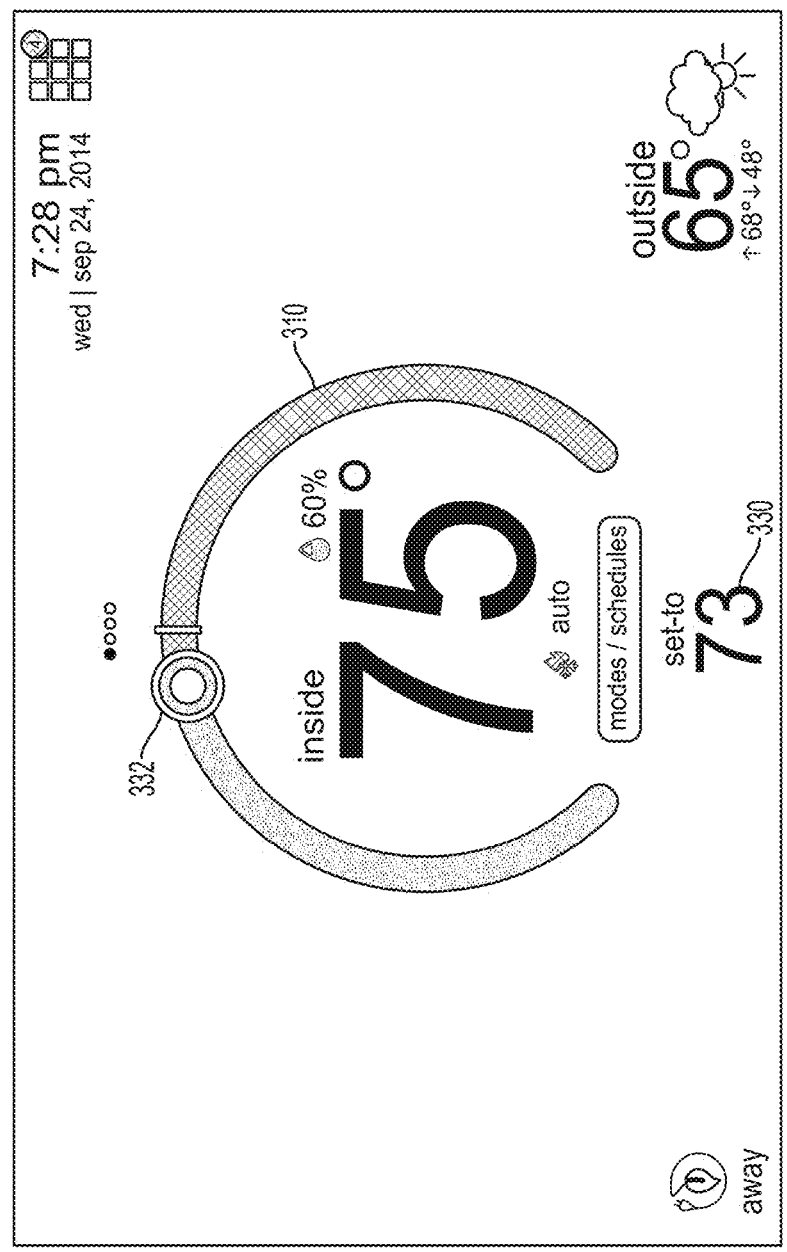
FIG. 3B illustrates an exemplary user interface screen to manage temperature settings of the programmable intelligent thermostat.

The user-interface screen 300 is further configured to display, within the substantially horseshoe-shaped temperature scale 310, a digital numerical representation of indoor temperature 324 and indoor humidity 327. The user-interface screen 300 further displays temperature setpoints such as, for example, a heat-to temperature setpoint 326 and a cool-to temperature setpoint 328. In other embodiments, user-interface screen 300 displays a single temperature set-point 330 as illustrated in FIG. 3B. In the embodiment illustrated in FIG. 3B, only one temperature set-point control 332 is positioned on the temperature scale 310 for temperature adjustment.

For purpose of this patent application, a setpoint or temperature setpoint refers to a target temperature setting of the HVAC system as set by a user or automatically based on a pre-defined schedule. In a typical embodiment, the substantially horseshoe-shaped temperature scale 310 is adjusted by tapping or dragging the heat set-point control 306, the cool set-point control 308, or the temperature set-point control 332 along circumferential edges of the temperature scale 310.

By tapping on the menu tab 302, the user is provided various menu items such as, for example, "SETTINGS," "ENERGY SAVINGS" "NOTIFICATIONS," and the like. In a typical embodiment, the MENU items may include, for example, text, icons, pictures, and the like. By selecting the menu items, the user is able to modify setting of the HVAC system based upon their needs and schedules. The menu tab 302 is further configured to display unread notifications for the user. The menu tab 302 is further configured to provide reminders and alert messages to the user relative to the HVAC system. In a typical embodiment, the reminders and alert messages may be, for example, system service reminders, system maintenance reminders, low humidity level indication, and other messages and alerts regarding system maintenance and safety. By tapping on the menu tab 302, details regarding the reminders and alert messages are displayed on the user-interface screen 300. The away tab 314 functions as a one-touch override button. In particular, upon selecting the away tab 314, regular programming schedule of the HVAC system is suspended and heating and cooling is automatically adjusted to save energy. The away tab 314 provides a convenient way for users to manually switch the HVAC system in an energy-saving mode via a single tap.

The status tab 312 provides HVAC system status messages such as, for example, heating, cooling, or humidifying. For example, the system status messages correspond to current operation of the HVAC system.

Figure 3C:
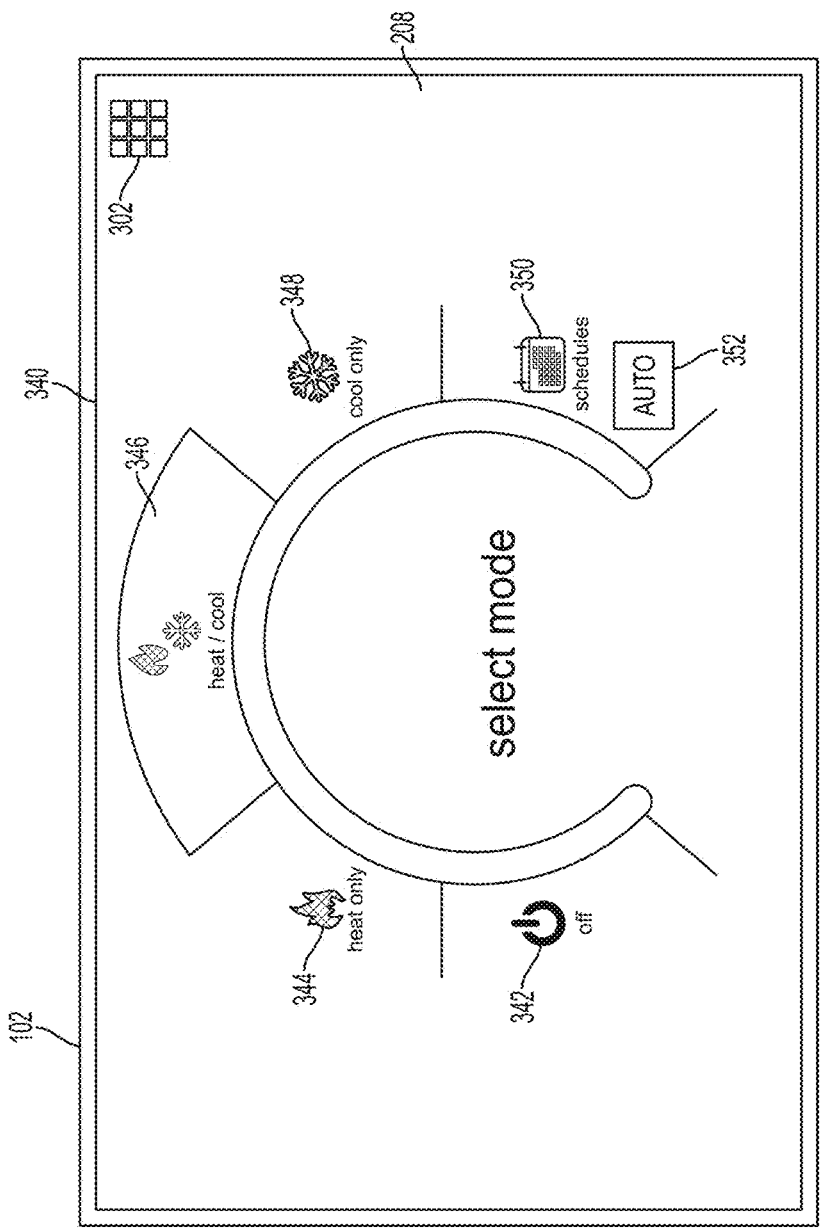
FIG. 3C illustrates an exemplary user interface screen to manage various modes of operation of the programmable intelligent thermostat.

FIG. 3C illustrates an exemplary user-interface screen 340 to manage various modes of operation of the programmable intelligent thermostat 102. In a typical embodiment, the user-interface screen 340 is displayed on the display 208 and may be accessible to a user by tapping the mode/schedule-selection tab 316. The user-interface screen 340 illustrates various modes of operation of the programmable intelligent thermostat 102. For example, the modes of operation of the programmable intelligent thermostat 102 may be, for example, heat-only mode 344, heat-cool mode 346, cool-only mode 348, and auto heat and cool mode 352. The user-interface screen 340 further illustrates a power-off tab 342 and a schedules tab 350.

Figure 4A:
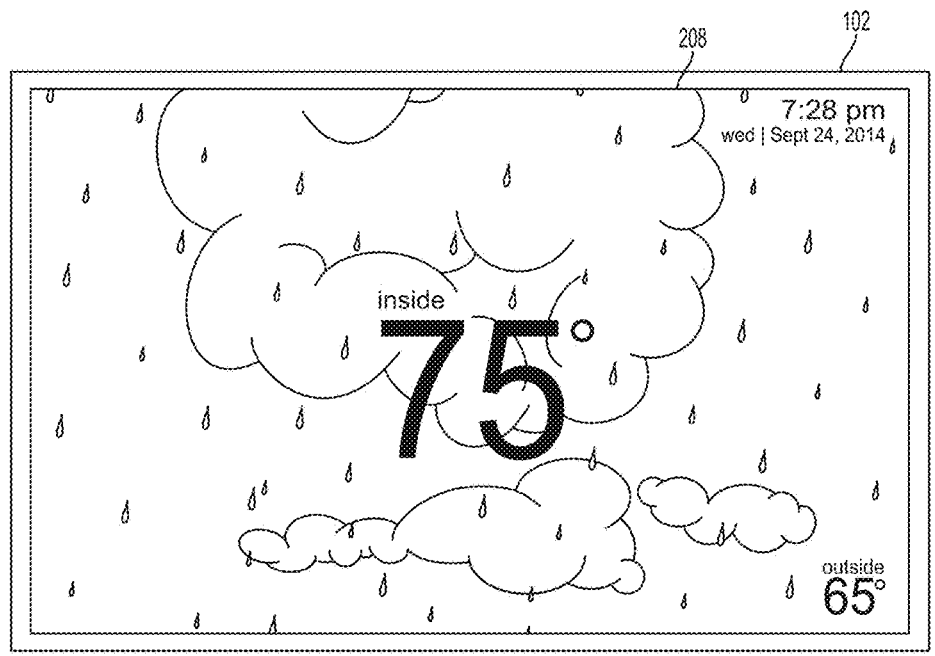
FIGS. 4A-4B illustrate exemplary animations on a display of the programmable intelligent thermostat.
Figure 4B:
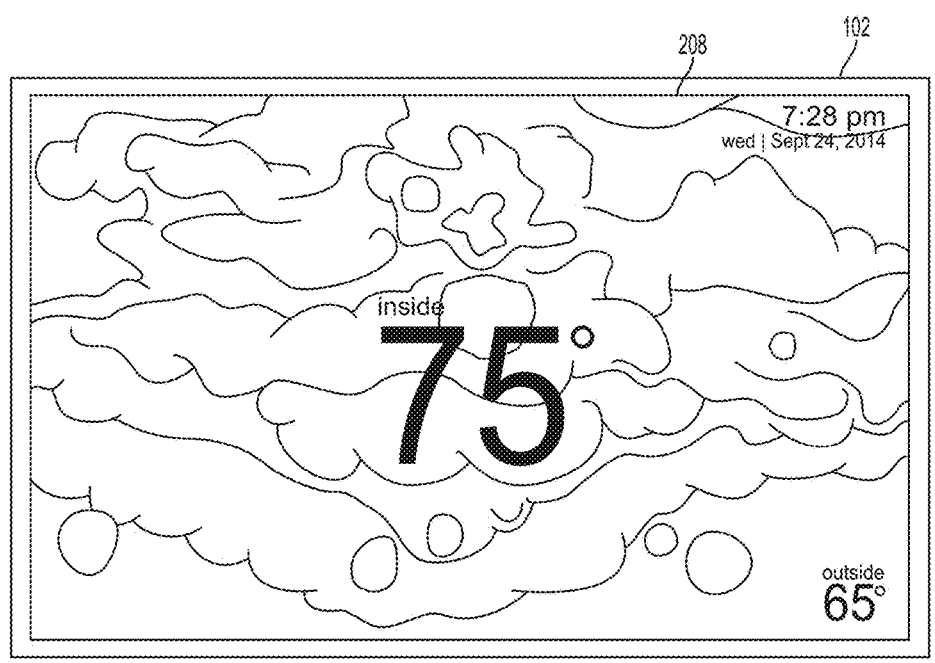

Traditional thermostat displays typically demonstrate current temperature settings, desired temperature settings, current time, and the like. However, the traditional thermostats do not demonstrate additional information that users may be interested in. For example, the user may have to look or step outside to get an indication of outside weather conditions. In a typical embodiment, the display 208 of the programmable intelligent thermostat 102 is configured to display an animation mimicking current weather conditions. For example, on a rainy day, the animation may reflect thunderstorms bringing down strikes of lightning and rain from a virtual sky as illustrated in FIG. 4A. On a mostly cloudy day, the animation may reflect mostly cloudy skies as illustrated in FIG. 4B. In a typical embodiment, the animations may be, for example, still images or videos mimicking current weather conditions. In short, a typical display 208 of the programmable intelligent thermostat 102 provides users with a visual simulation of outside weather conditions along with numeric representations of inside and outside temperature.

Figure 4C:
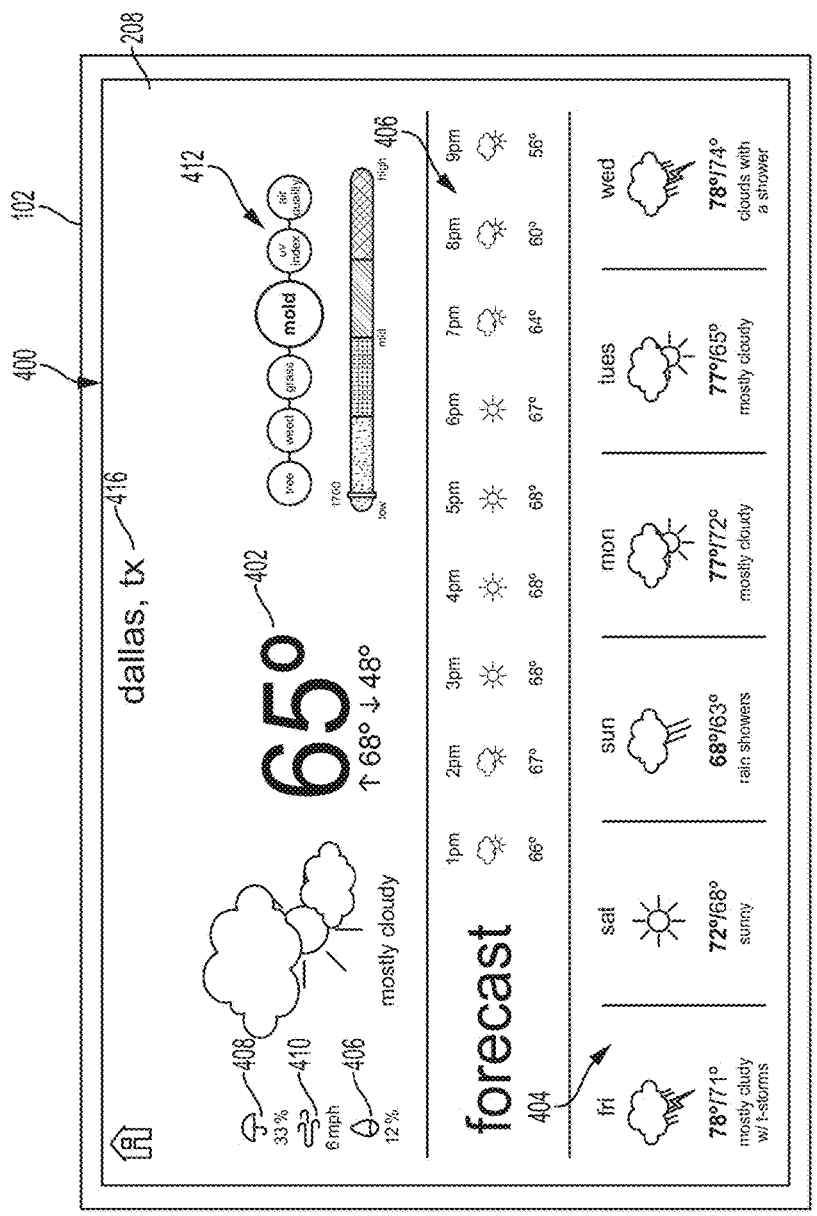
FIG. 4C illustrates an exemplary screen of the programmable intelligent thermostat displaying weather conditions.

FIG. 4C illustrates an exemplary screen 400 of the programmable intelligent thermostat 102 displaying weather conditions. In a typical embodiment, the exemplary screen 400 is displayed on the display 208. The display 208 of the programmable intelligent thermostat 102 comprises a customizable color touch-screen display configured to display a representation of outside weather conditions. In a typical embodiment, the exemplary screen 400 of the programmable intelligent thermostat 102 displays outside weather conditions 402 along with a weather forecast for the upcoming days 404. In addition, an hour-by-hour breakdown 406 of outside weather conditions is also displayed. Furthermore, the exemplary screen 400 displays one or more of humidity 406, chance of rain 408, wind speed 410, and air quality 412. The exemplary screen 400 of the programmable intelligent thermostat 102 further displays city and state information 416. For exemplary illustration, location and details relative to weather conditions as demonstrated in FIG. 4C is exemplary; however, in other embodiments, the location and details relative to the weather conditions may be altered based upon user requirements.

Figure 5:
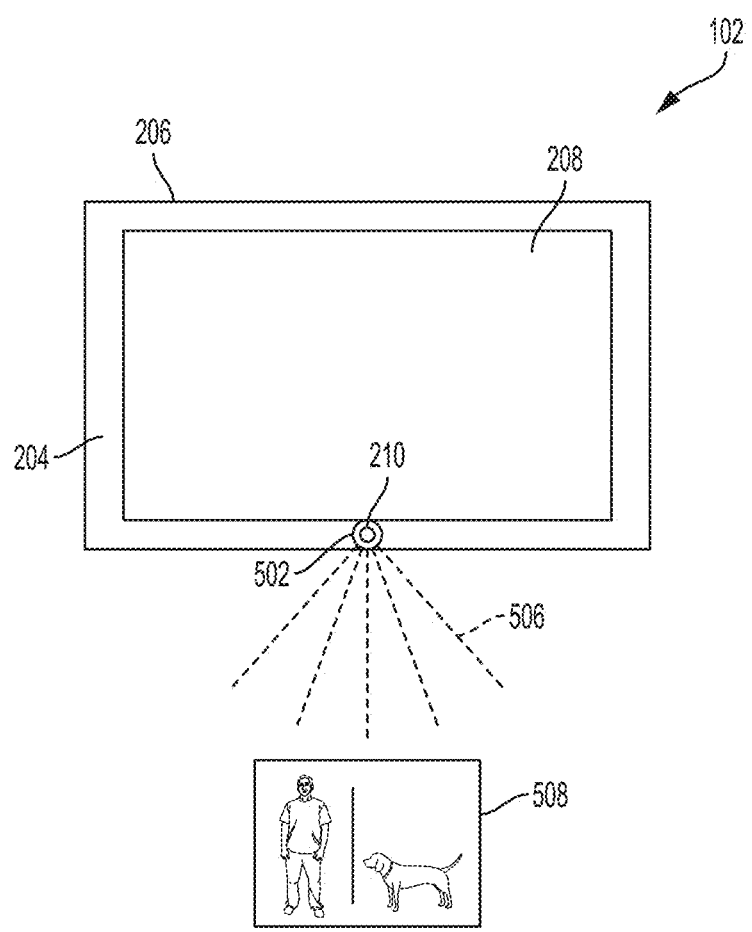
FIG. 5 illustrates the programmable intelligent thermostat housing at least one sensor.

FIG. 5 illustrates an exemplary programmable intelligent thermostat 102 housing at least one sensor 210. The programmable intelligent thermostat 102 includes a front housing 204 and a rear housing 206. The rear housing 206 is removably attached to a wall via fasteners (not illustrated), such as, for example, screws, nuts, snaps, pins, and the like. The front housing 204 of the programmable intelligent thermostat 102 includes a display 208 and a substantially circular opening 502 for housing the at least one sensor 210. In one embodiment, a proximity sensor is incorporated in the programmable intelligent thermostat 102 to detect whether the home is occupied. In another embodiment, a light sensor is incorporated in the programmable intelligent thermostat 102 to detect room lighting. In yet another embodiment, a singular sensor such as, for example, a video camera, is incorporated in the programmable intelligent thermostat 102 to perform operations such as, for example, room lighting determination, distance determination, facial detection, voice recognition, occupancy detection, and the like.

In a typical embodiment, the at least one sensor 210 is configured to emit electromagnetic field or a beam of electromagnetic radiation 506. The at least one sensor 210 looks for changes in the field or return signal caused by movement of, for example, an occupant 508. The occupant 508 may be, for example, a human or a pet. In other embodiments, the at least one sensor 210 is configured to detect an approaching occupant 508 by infrared light reflection. In other embodiments, the at least one sensor 210 is configured to perform facial recognition of the occupant 508 to distinguish between a human and a pet. In a typical embodiment, information from the at least one sensor 210 is used to determine whether an occupant 508 is present. In addition, information from the at least one sensor 210 is used to determine, for example, distance of the occupant 508 from the programmable intelligent thermostat 102, size of the occupant 508, whether the occupant 508 is a human or pet, and the like. In some embodiments, based upon the determination, various component of the programmable intelligent thermostat 102 are automatically adjusted. In other embodiments, based upon the determination, the programmable intelligent thermostat 102 automatically adjusts heating or cooling operation of the HVAC system to conserve energy. In some embodiments, the HVAC system may adjust heating or cooling differently depending on whether a human or a pet has been detected.

For example, if no movement has occurred, the programmable intelligent thermostat 102 is automatically powered off. In another example, information from the at least one sensor 210 is utilized to manage contents displayed on the display 208 of the programmable intelligent thermostat 102. For example, certain elements may be displayed on the display 208 of the programmable intelligent thermostat 102 based upon the occupant 508 being at a first distance while other elements may be displayed on the display 208 of the programmable intelligent thermostat 102 based upon the occupant 508 being at a second distance. In another example, information from the at least one sensor 210 is utilized to determine proximity of the occupant 508 in the range of, for example, one meter to allow the programmable intelligent thermostat 102 to initiate "wake-up" prior to the occupant 508 touching the display 208 of the programmable intelligent thermostat 102. In another example, information from the at least one sensor 210 is utilized to adjust display attributes such as, for example, color, contrast, background, brightness levels, contents, and the like. For example, the brightness level of the display 208 is automatically raised or lowered based upon a distance of the occupant 508 from the programmable intelligent thermostat 102.

Figure 6:
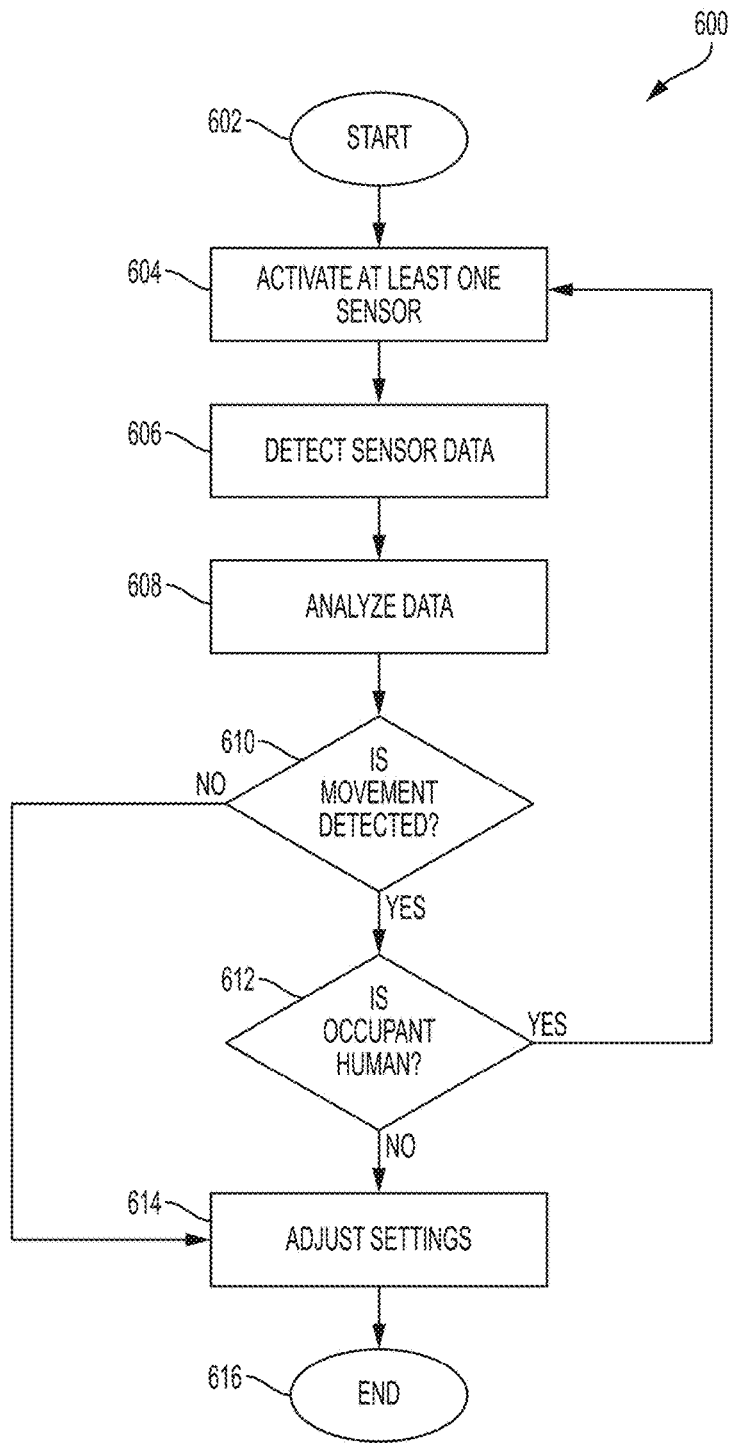
FIG. 6 is a flow chart illustrating a process for analyzing data from at least one sensor.

FIG. 6 is a flow chart illustrating a process 600 for analyzing data from at least one sensor. For illustrative purposes, the process 600 will be described relative to FIGS. 1-5. The process 600 starts at step 602. At step 604, the processing circuitry 209 activates the at least one sensor 210. In a typical embodiment, the at least one sensor 210 may be activated at routine intervals such as, for example, 10 milliseconds, 15 milliseconds, 5 seconds, 10 seconds, 1 minute, 5 minutes, 10 minutes, and the like. In a typical embodiment, the at least one sensor 210 may be, for example, a sensor that is capable of detecting presence of nearby objects. In one embodiment, a proximity sensor is incorporated in the programmable intelligent thermostat to detect whether the home is occupied. In another embodiment, a light sensor is incorporated in the programmable intelligent thermostat to detect room lighting. In yet another embodiment, a singular sensor such as, for example, a video camera is incorporated in the programmable intelligent thermostat 102 to perform operations such as, for example, room lighting determination, distance determination, facial detection, voice recognition, occupancy detection, and the like.

At step 606, sensor data is detected and passed along to the processing circuitry 209. In a typical embodiment, the at least one sensor 210 is configured to emit electromagnetic field or a beam of electromagnetic radiation 506 and looks for changes in the field or return signal caused by movement of the occupant 508. The occupant 508 may be, for example, a human or a pet. At step 608, the processing circuitry 209 analyzes the sensor data. At step 610, the processing circuitry 209 determines whether movement has occurred. If it is determined at step 610 that movement has occurred, the process 600 proceeds to step 612. At step 612, the processing circuitry 209 determines whether the movement is by a human or a pet. If it is determined at step 612 that the movement is by a human, the process 600 proceeds to step 604. However, if it is determined at step 612 that the movement was not by a human, the process 600 proceeds to step 614.

However, if it is determined at step 610 that no movement has occurred, the process 600 proceeds to step 614. At step 614, various components and settings of the programmable intelligent thermostat 102 are automatically adjusted. For example, if no movement has occurred, the programmable intelligent thermostat 102 is automatically powered off. In another example, if no movement has occurred or if the movement was not by a human, the programmable intelligent thermostat 102 suspends regular programming schedule of the HVAC system and automatically adjusts heating and cooling to conserve energy. In some embodiments, the HVAC system may adjust heating or cooling differently depending on whether a human or a pet has been detected. In another example, if the movement is by a human, the programmable intelligent thermostat 102 can initiate "wake-up" prior to the human touching the display 208 of the programmable intelligent thermostat 102. In another example, the display attributes such as, for example, color, contrast, background, brightness levels, contents are adjusted. For example, the brightness level of the display 208 is automatically raised or lowered based upon a distance of the occupant 508 from the programmable intelligent thermostat 102. At step 616, the process 600 ends.

In order for the HVAC systems to operate at peak efficiency, home owners are often advised by HVAC system manufacturers to schedule regular system maintenance. Normally, a maintenance call requires, for example, changing air filters, recharging coolant levels, cleaning coils, cleaning heat-transfer surfaces, and ensuring that all air flow is dirt free. In certain instances when maintenance/repair work has been performed on several occasions, a contractor is typically aware of only the most recent maintenance/repair work performed. On many occasions, the maintenance/repair work performed is never updated. On other occasions, the maintenance/repair work performed is documented internally but never exposed to end users. In particular, there is often no up-to-date report of all the maintenance/repair work performed. A diligent contractor may download and keep a copy of the up-to-date report; however, considerable time and effort may be required to determine, for example, differences between the maintenance/repair work performed in the past.

In a typical embodiment, the smart home environment system 100 (illustrated in FIG. 1) is configured to maintain up-to-date report of the entire maintenance/repair record of the HVAC system. For example, every time a maintenance/repair work is performed on a component of the HVAC system, information relative to the component that required maintenance/repair along with details of the work performed is recorded. The information may include, for example, component serial number, component model number, hardware updates, software updates, factory settings, install settings, user settings, location information relative to the component, temperature and humidity data, settings of the programmable intelligent thermostat 102, maintenance performed, repairs performed, system-performance reports, maintenance reports, and the like. The information may also include, for example, comparison reports.

Figure 7A:
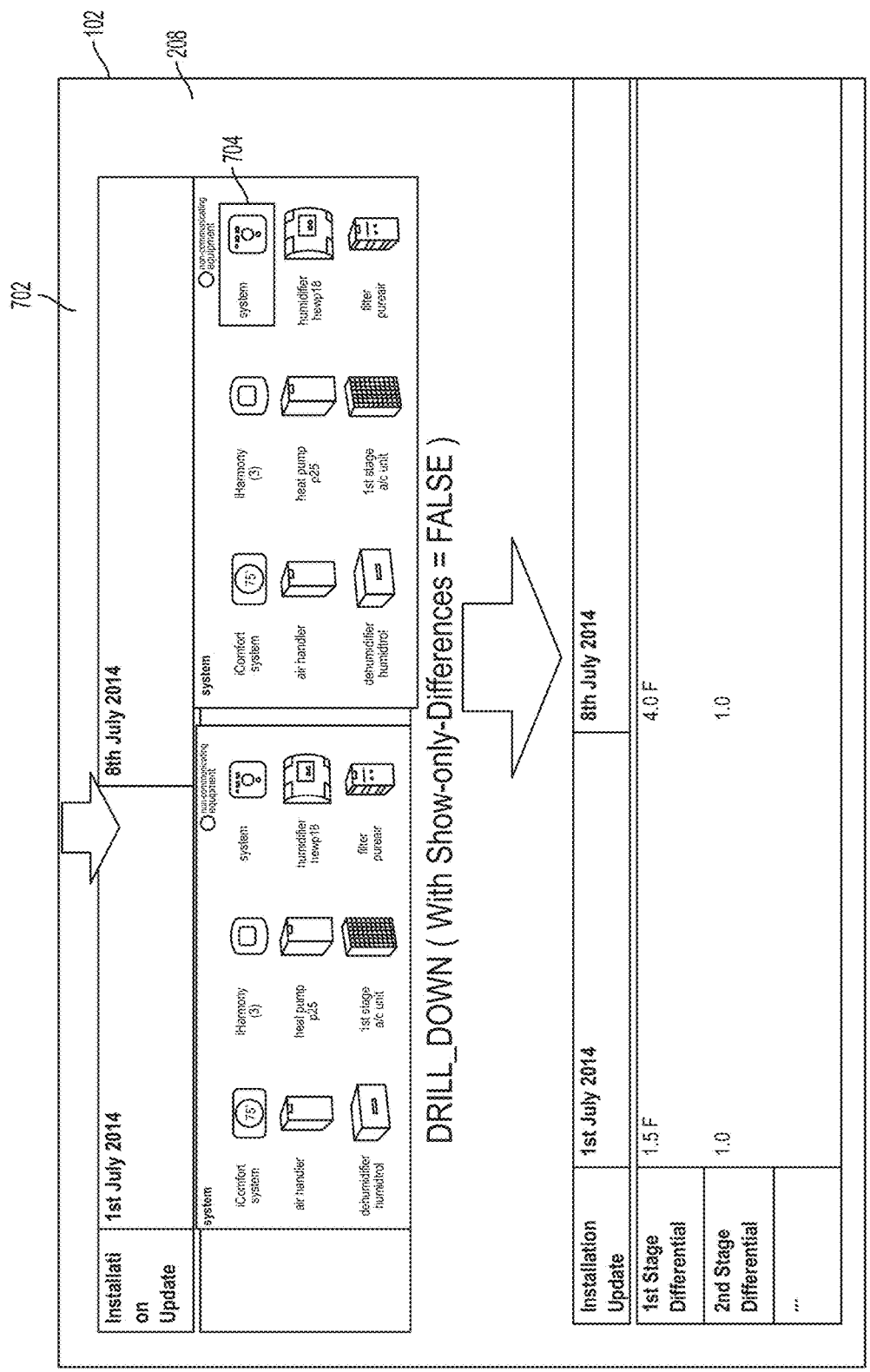
FIG. 7A illustrates an exemplary comparison report.

FIG. 7A illustrates an exemplary comparison report 702. For illustrative purposes, the comparison report 702 will be described relative to FIGS. 1-5. In a typical embodiment, the comparison report 702 is displayed on the display 208 of the programmable intelligent thermostat 102. The comparison report 702 indicates differences 704 between various maintenance/repair records. In a typical embodiment, the comparison report indicates changes 704 between various maintenance/repair records by, for example, colored highlighting, differing font characteristics, block insertion, and the like. In a typical embodiment, the comparison report 702 may be in the form of, for example, text, graphs, pictures, charts, and any combination thereof. In a typical embodiment, the comparison report 702 is generated by the at least one server or cloud-computing system 114. In some embodiments, the comparison report may be forwarded to the contractor 116 prior to the contractor 116 initiating the maintenance/repair work. In other embodiments, the comparison report may be forwarded to the programmable intelligent thermostat 102 for viewing on the display 208.

Figure 7B:
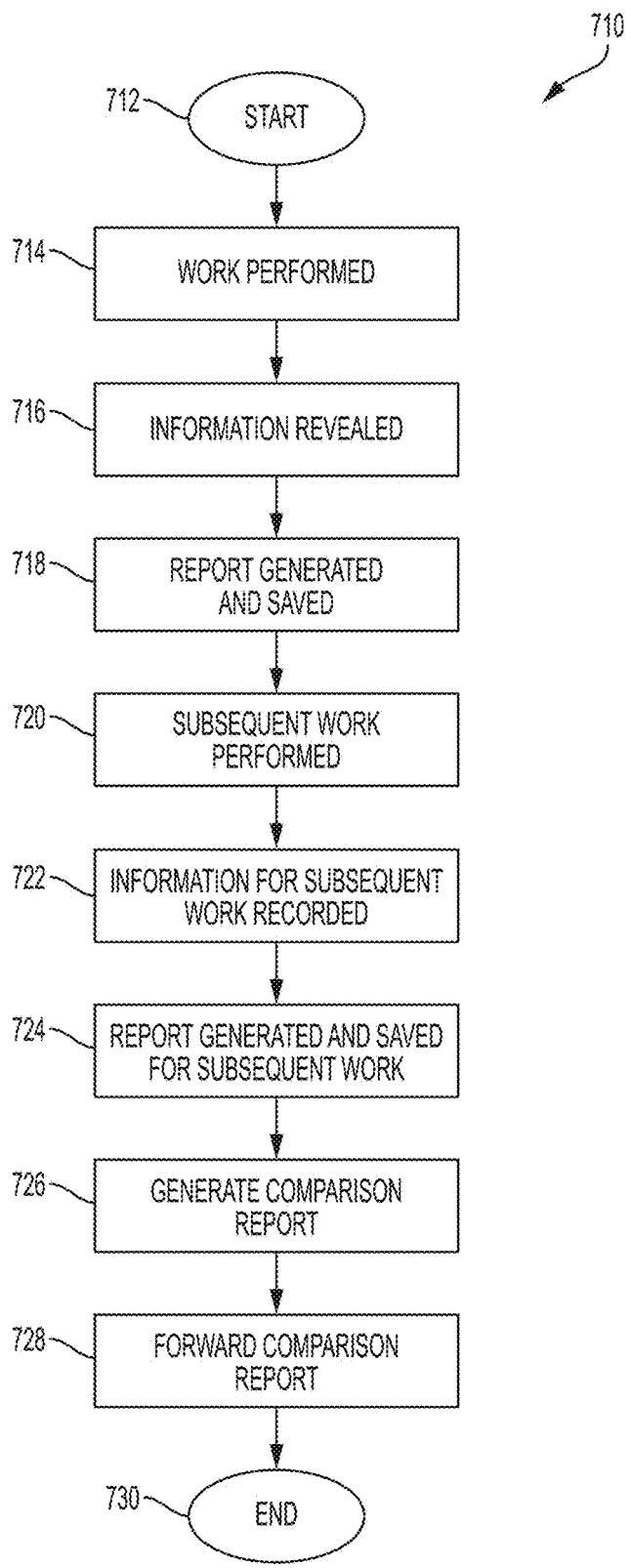
FIG. 7B is a flow chart illustrating a process for preparing comparison reports.

FIG. 7B is a flow chart illustrating a process 710 for preparing comparison reports. For illustrative purposes, the process 710 will be described relative to FIGS. 1-7A. The process 710 starts at step 712. At step 714 a maintenance/repair work is performed on, for example, a component of the HVAC system. At step 716, information relative to the component that required maintenance/repair along with detail of the work performed is recorded at the at least one server or cloud-computing system 114. The information may include, for example, component serial number, component model number, hardware updates, software updates, factory settings, install settings, user settings, location information relative to the component, temperature and humidity data, settings of the programmable intelligent thermostat 102, maintenance performed, repairs performed, and the like. At step 718, a report is generated and stored at the at least one server or cloud-computing system 114. The report details the maintenance/repair work performed.

At step 720, subsequent maintenance/repair work is performed on, for example, a component of the HVAC system. At step 722, information relative to the component that required maintenance/repair along with detail of the subsequent work performed is recorded at the at least one server or cloud-computing system 114. At step 724, a subsequent report is generated and stored at the at least one server or cloud-computing system 114. The subsequent report details the subsequent maintenance/repair work performed. At step 726, the at least one server or cloud-computing system 114 performs a comparison between the two reports and generates a comparison report. The comparison report 702 indicates differences between various maintenance/repair records. In a typical embodiment, the comparison report indicates changes between various maintenance/repair records by, for example, colored highlighting, differing font characteristics, block insertion, and the like. In a typical embodiment, the comparison report 702 may be in the form of, for example, text, graphs, pictures, charts, and any combination thereof. At step 728, the at least one server or cloud-computing system 114 forwards the comparison report. In some embodiments, the comparison report may be forwarded to the contractor 116 prior to the contractor 116 initiating the maintenance/repair work. In other embodiments, the comparison report may be forwarded to the programmable intelligent thermostat 102 for viewing on the display 208. At step 730, the process 710 ends.

Figure 7C:
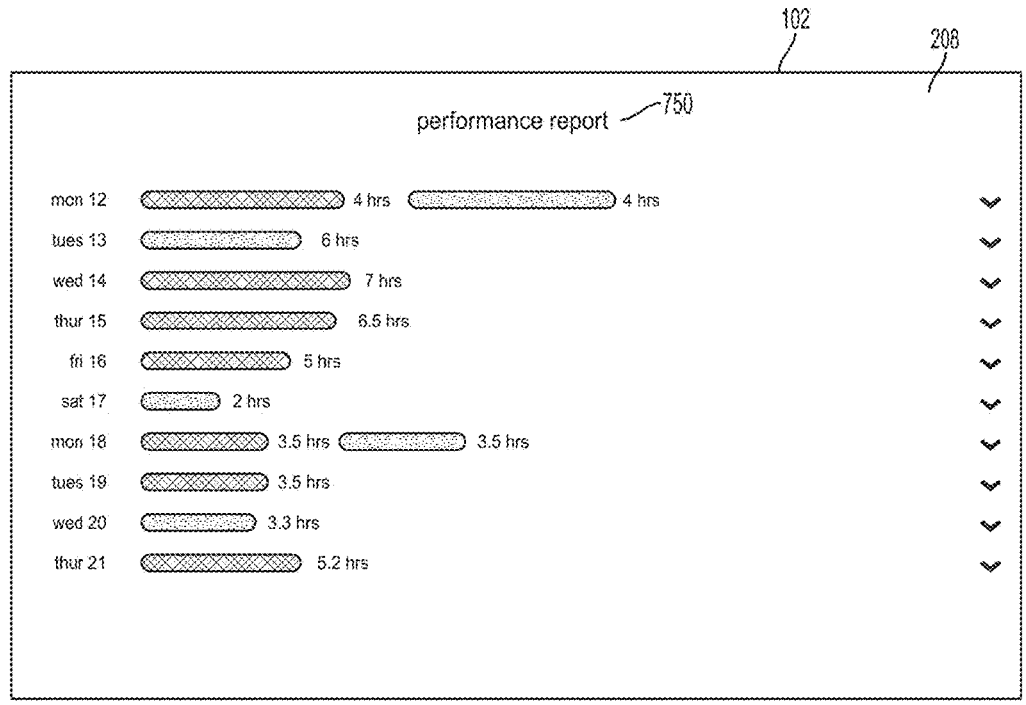
FIGS. 7C-7D illustrate exemplary system performance reports.
Figure 7D:
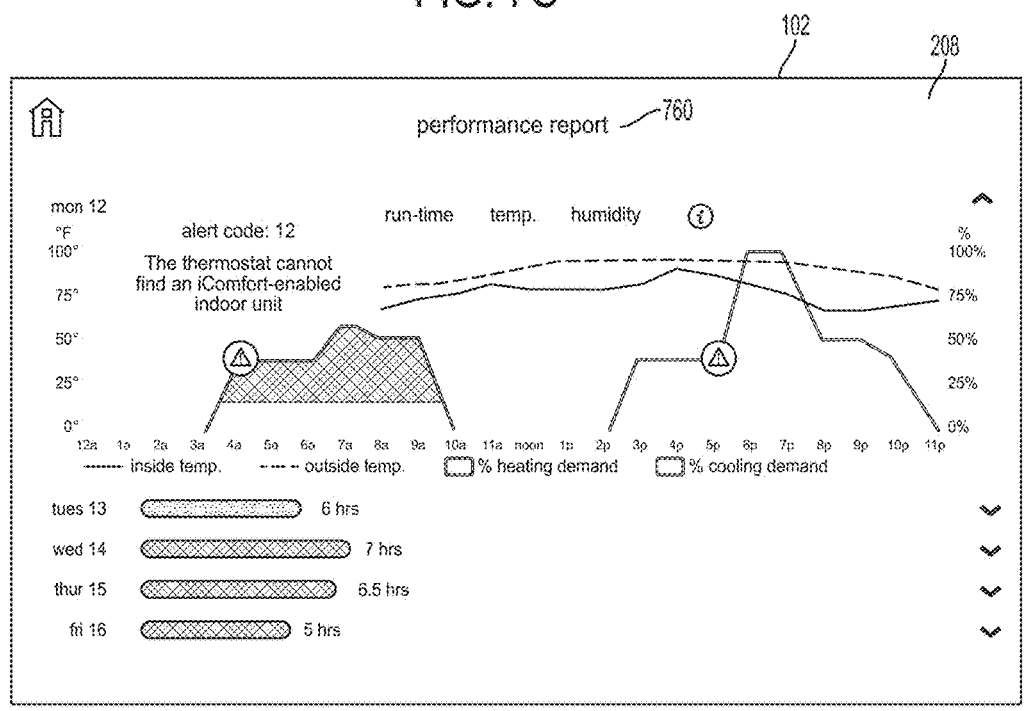

FIGS. 7C-7D illustrate exemplary system reports 750, 760. For illustrative purposes, the system reports 750, 760 will be described relative to FIGS. 1-5. The system reports 750, 760 may be displayed on the display 208 of the programmable intelligent thermostat 102. In a typical embodiment, the system reports 750, 760 may be in the form of, for example, text, graphs, pictures, charts, and any combination thereof. In a typical embodiment, the system reports 750, 760 are generated by the at least one server or cloud-computing system 114 and forwarded to the programmable intelligent thermostat 102 for presentation on the display 208. The system reports 750, 760 provide information about the performance of the HVAC system.

Figure 7E:
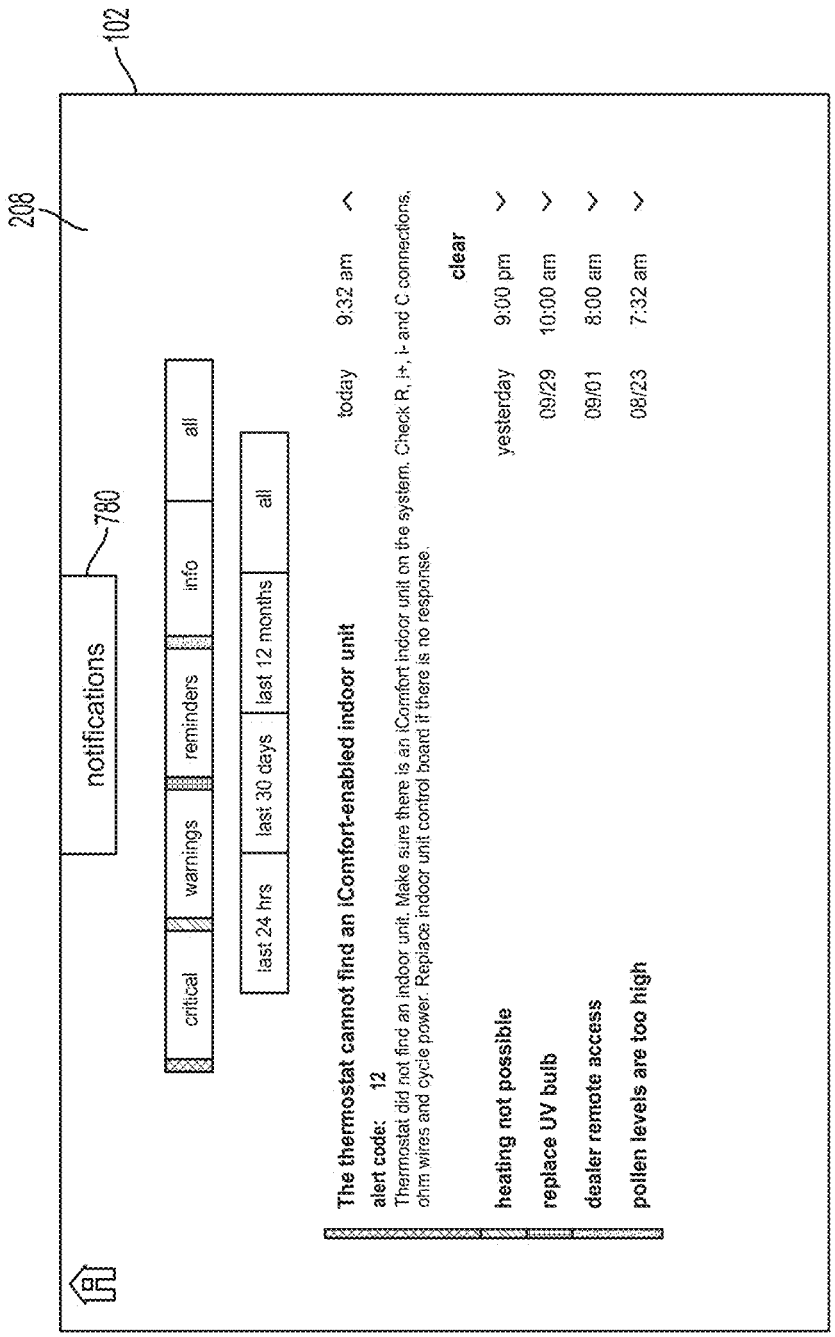
FIG. 7E illustrates exemplary system notifications.

FIG. 7E illustrates exemplary system notifications 780. For illustrative purposes, the system notifications 780 will be described relative to FIGS. 1-5. The system notifications 780 may be displayed on the display 208 of the programmable intelligent thermostat 102. In a typical embodiment, the system notifications 780 may be in the form of, for example, text, graphs, pictures, charts, and any combination thereof. In a typical embodiment, the system notifications 780 are generated by the at least one server or cloud-computing system 114 and forwarded to the programmable intelligent thermostat 102 for presentation on the display 208. Oftentimes, homeowners have a hard remembering when to change, for example, a furnace filter, ultraviolet (UV) bulb, humidifier pad, and the like. In order for the HVAC system to operate at peak efficiency, it is important to regularly replace these. The system notifications are reminder messages for homeowners with details regarding system maintenance. For example, the system notifications may contain prognostic messages relative to critical errors and alerts in the HVAC system. In a typical embodiment, the users are typically promoted with a dialog window when a notification occurs. In some embodiments, the dialog windows are color coded based upon importance.

Figure 7F:
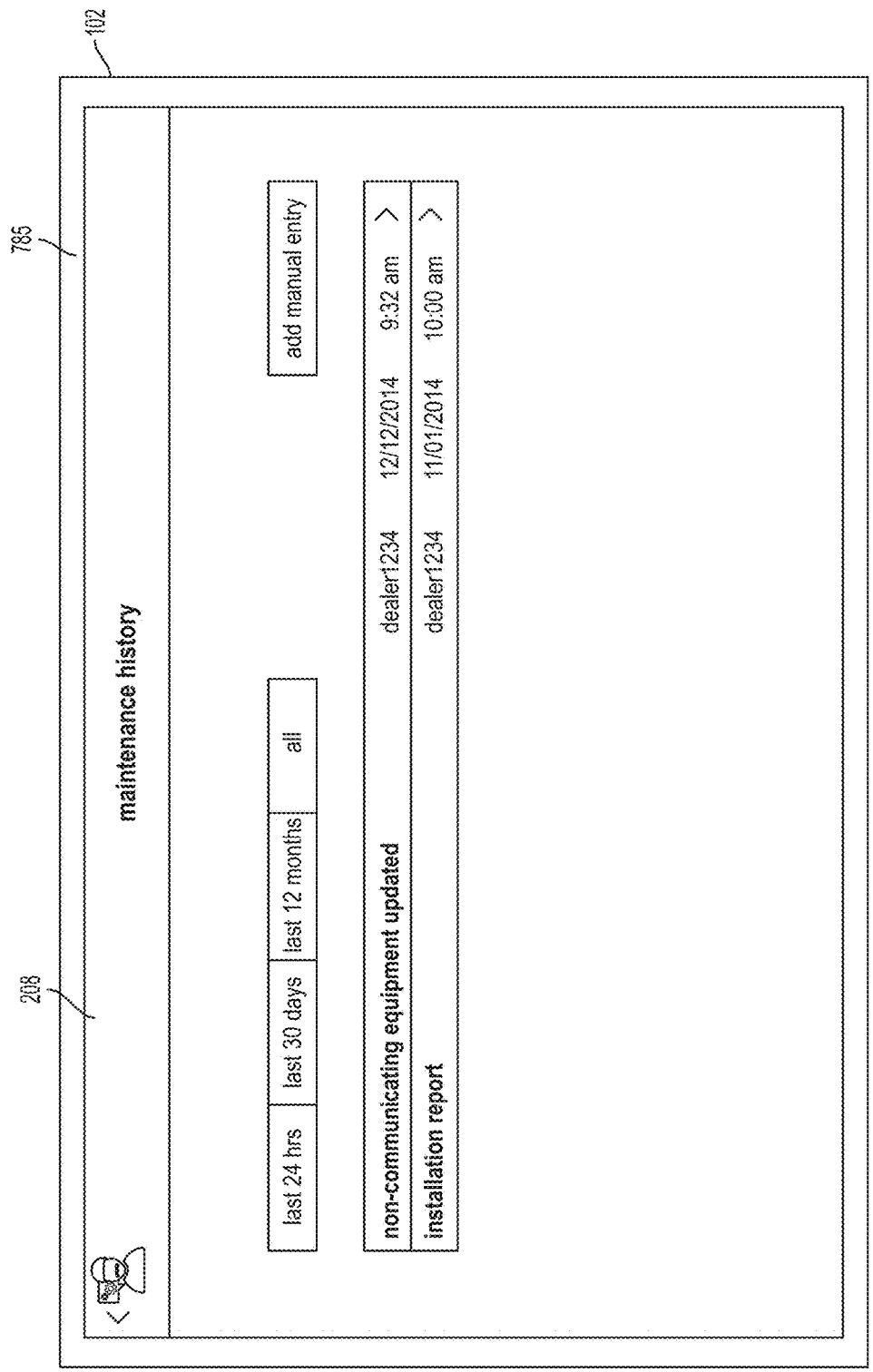
FIG. 7F illustrates an exemplary system maintenance history report.

FIG. 7F illustrate exemplary system maintenance history report 785. For illustrative purposes, the system maintenance history report 785 will be described relative to FIGS. 1-5. The system maintenance history report 785 may be displayed on the display 208 of the programmable intelligent thermostat 102. In a typical embodiment, the system maintenance history report 785 may be in the form of, for example, text, graphs, pictures, charts, and any combination thereof. In a typical embodiment, the system maintenance history report 785 is generated by the at least one server or cloud-computing system 114 and forwarded to the programmable intelligent thermostat 102 for presentation on the display 208. The system maintenance history report 785 provides information about the maintenance work performed on the HVAC system.

Figure 7G:
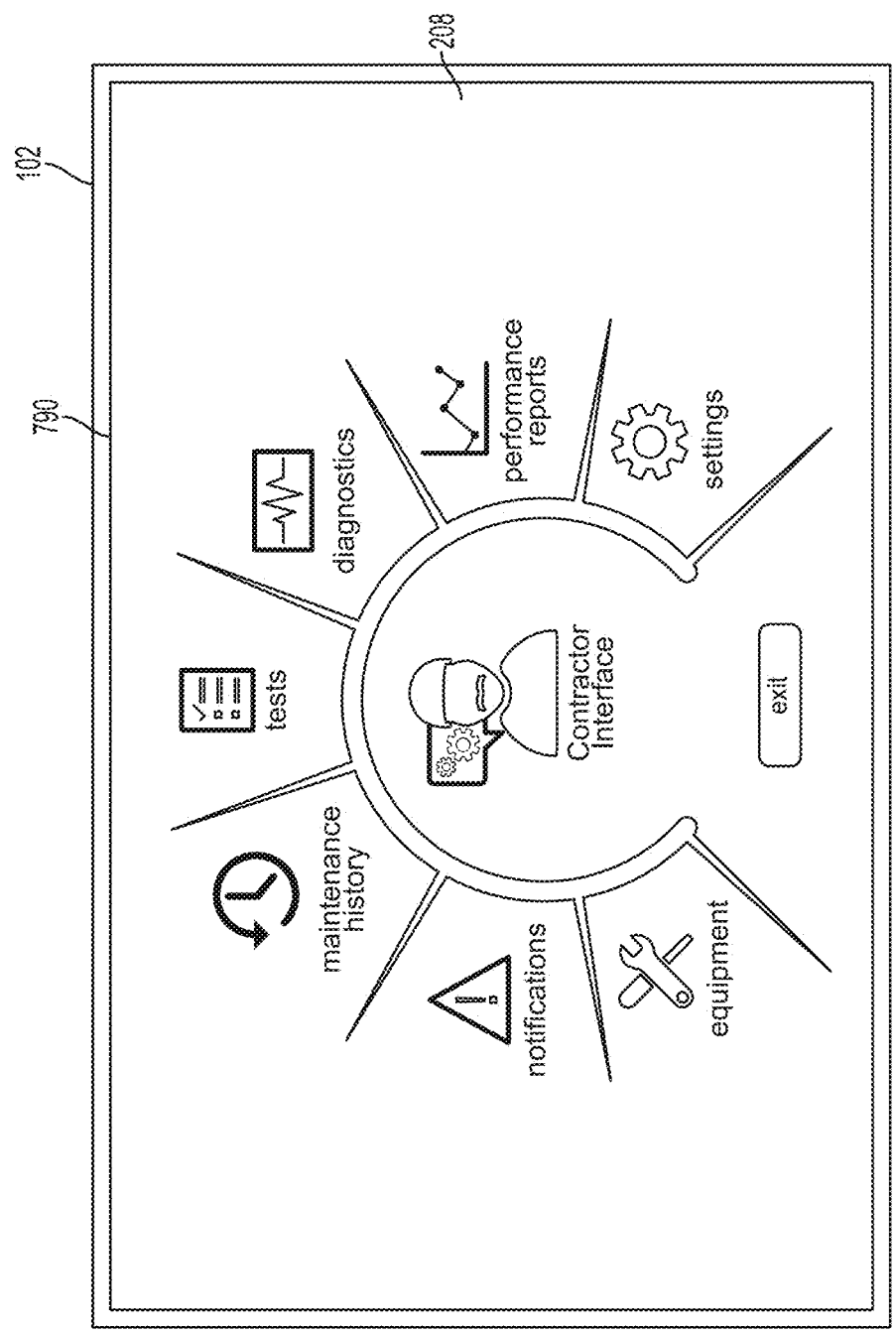
FIG. 7G illustrates an exemplary interface screen for accessing information.

FIG. 7G illustrates an exemplary interface screen 790 through which the comparison report 702, the exemplary system reports 750, 760, and the system notifications 780 can be accessed via the display 208 of the programmable intelligent thermostat 102.

For purposes of this patent application, the term computer-readable storage medium encompasses one or more tangible computer-readable storage media possessing structures. As an example and not by way of limitation, a computer-readable storage medium may include a semiconductor-based or other integrated circuit (IC) (such as, for example, a field-programmable gate array (FPGA) or an application-specific IC (ASIC)), a hard disk, an HDD, a hybrid hard drive (HHD), an optical disc, an optical disc drive (ODD), a magneto-optical disc, a magneto-optical drive, a floppy disk, a floppy disk drive (FDD), magnetic tape, a holographic storage medium, a solid-state drive (SSD), a RAM-drive, a SECURE DIGITAL card, a SECURE DIGITAL drive, a flash memory card, a flash memory drive, or any other suitable tangible computer-readable storage medium or a combination of two or more of these, where appropriate.

Particular embodiments may include one or more computer-readable storage media implementing any suitable storage. In particular embodiments, a computer-readable storage medium implements one or more portions of the processor 240, one or more portions of the system memory 250, one or more portions of the mass storage device 246, or a combination of these, where appropriate. In particular embodiments, a computer-readable storage medium implements RAM or ROM. In particular embodiments, a computer-readable storage medium implements volatile or persistent memory. In particular embodiments, one or more computer-readable storage media embody encoded software.

In this patent application, reference to encoded software may encompass one or more applications, bytecode, one or more computer programs, one or more executables, one or more instructions, logic, machine code, one or more scripts, or source code, and vice versa, where appropriate, that have been stored or encoded in a computer-readable storage medium. In particular embodiments, encoded software includes one or more application programming interfaces (APIs) stored or encoded in a computer-readable storage medium. Particular embodiments may use any suitable encoded software written or otherwise expressed in any suitable programming language or combination of programming languages stored or encoded in any suitable type or number of computer-readable storage media. In particular embodiments, encoded software may be expressed as source code or object code. In particular embodiments, encoded software is expressed in a higher-level programming language, such as, for example, C, Python, Java, or a suitable extension thereof. In particular embodiments, encoded software is expressed in a lower-level programming language, such as assembly language (or machine code). In particular embodiments, encoded software is expressed in JAVA. In particular embodiments, encoded software is expressed in Hyper Text Markup Language (HTML), Extensible Markup Language (XML), or other suitable markup language.

Depending on the embodiment, certain acts, events, or functions of any of the algorithms described herein can be performed in a different sequence, can be added, merged, or left out altogether (e.g., not all described acts or events are necessary for the practice of the algorithms). Moreover, in certain embodiments, acts or events can be performed concurrently, e.g., through multi-threaded processing, interrupt processing, or multiple processors or processor cores or on other parallel architectures, rather than sequentially. Although certain computer-implemented tasks are described as being performed by a particular entity, other embodiments are possible in which these tasks are performed by a different entity.

Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

While the above detailed description has shown, described, and pointed out novel features as applied to various embodiments, it will be understood that various omissions, substitutions, and changes in the form and details of the devices or algorithms illustrated can be made without departing from the spirit of the disclosure. As will be recognized, the processes described herein can be embodied within a form that does not provide all of the features and benefits set forth herein, as some features can be used or practiced separately from others. The scope of protection is defined by the appended claims rather than by the foregoing description. All changes which come within the meaning and range of equivalency of the claims are to be embraced within their scope.

What is claimed is:

1. A home environment system comprising:
   a programmable thermostat;
   at least one server computer configured to wirelessly communicate with the programmable thermostat via a wireless network;
   wherein the at least one server computer is configured to:
      receive information regarding repair work performed on at least one component of a heating, ventilation, and air conditioning (HVAC) system;
      generate a first report regarding the repair work performed;
      receive information regarding subsequent repair work performed on the at least one component of the HVAC system;
      generate a second report regarding the subsequent repair work performed;
      perform a comparison between the first report and the second report;
      generate a comparison report that indicates differences between the first report and the second report, the comparison report further illustrates changes between various repair records of the at least one component of the HVAC system;
      forward the generated comparison report to at least one of the programmable thermostat and at least one communication device;
   wherein the at least one server computer is configured to forward the generated comparison report to a maintenance contractor associated with the at least one communication device, prior to the maintenance contractor initiating additional work;
   wherein the information comprises details of the at least one component of the HVAC system on which work was performed;
   wherein the details comprise a serial number, model number, hardware updates, software updates, and location; and
   wherein the differences between the first report and the second report are illustrated via at least one of colored highlighting, differing fonts, and block insertion.

2. The home environment system of claim 1 comprising:
   a networking device;
   wherein the networking device, the at least one communication device, and the at least one server computer are each communicably coupled to the wireless network; and
   wherein the networking device allows the programmable thermostat to communicate with the at least one server computer.

3. The home environment system of claim 1, wherein:
   the at least one communication device comprises at least one of a desktop computer, a laptop computer, a tablet computer, a smart phone, and a personal digital assistant (PDA); and
   the at least one communication device is associated with at least one of a homeowner and a maintenance contractor.

4. The home environment system of claim 1, wherein the first report, the second report, and the comparison report each comprise at least one of text, graphs, pictures, and charts.

5. The home environment of claim 1, wherein:
the programmable thermostat comprises:
a front housing;
a rear housing interoperably coupled to the front housing;
a display integrated with the front housing; and
the display is a touch-screen display configured to display the comparison report.

6. The home environment of claim 1, wherein the at least one server computer is configured to receive the information from a contractor associated with the at least one communication device.

7. A method comprising, by a home environment system:
utilizing at least one server computer to wirelessly perform the following:
receiving information regarding repair work performed on at least one component of a heating, ventilation, and air conditioning (HVAC) system;
generating a first report regarding the repair work performed;
receiving information regarding subsequent repair work performed on the at least one component of the HVAC system;
generating a second report regarding the subsequent repair work performed;
performing a comparison between the first report and the second report;
generating a comparison report that indicates differences between the first report and the second report and illustrates changes between various repair records of the at least one component of the HVAC system;
forwarding the generated comparison report to at least one of a programmable thermostat and at least one communication device;
wherein the at least one server computer is configured to forward the generated comparison report to a maintenance contractor associated with the at least one communication device, prior to the maintenance contractor initiating additional work;
wherein the information comprises details of the at least one component of the HVAC system on which work was performed;
wherein the details comprise a serial number, model number, hardware updates, software updates, and location; and
wherein the differences between the first report and the second report are illustrated via at least one of colored highlighting, differing fonts, and block insertion.

8. The method of claim 7, wherein the at least one communication device is associated with a maintenance contractor.

9. A home environment system comprising:
at least one server, wherein the at least one server is configured to implement a method comprising:
receiving information regarding repair work performed on at least one component of a heating, ventilation, and air conditioning (HVAC) system;
generating a first report of the repair work performed;
receiving information regarding subsequent repair work performed on the at least one component of the HVAC system;
generating a second report of the subsequent repair work performed;
performing a comparison between the first report and the second report;
generating a comparison report that indicates differences between the first report and the second report and illustrating changes between various repair records of the at least one component of the HVAC system; and
forwarding the generated comparison report to at least one of a programmable thermostat and at least one communication device;
wherein the at least one server is configured to forward the generated comparison report to a maintenance contractor associated with the at least one communication device, prior to the maintenance contractor initiating additional work;
wherein the information comprises details of the at least one component of the HVAC system on which work was performed;
wherein the details comprise a serial number, model number, hardware updates, software updates, and location; and
wherein the differences between the first report and the second report are illustrated via at least one of colored highlighting, differing fonts, and block insertion.

10. The home environment system of claim 9, wherein the programmable thermostat is configured to communicate with the at least one server via a wireless network.

11. The home environment system of claim 9, wherein:
the programmable thermostat comprises:
a front housing;
a rear housing interoperably coupled to the front housing;
a display integrated with the front housing; and
the display is a touch-screen display configured to display the comparison report.

12. The home environment system of claim 10, wherein the at least one communication device is associated with a maintenance contractor.

* * * * *